No. 804,131. PATENTED NOV. 7, 1905.
H. S. JOHNSON.
STEADY REST FOR LATHES.
APPLICATION FILED JAN. 25, 1904.
4 SHEETS—SHEET 2.
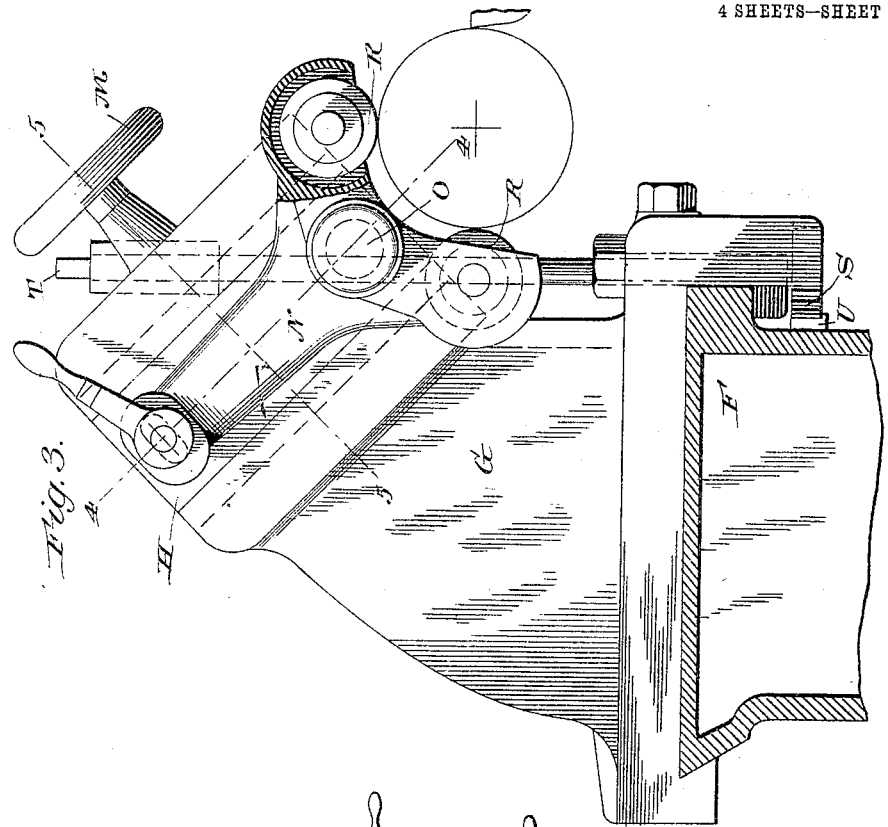
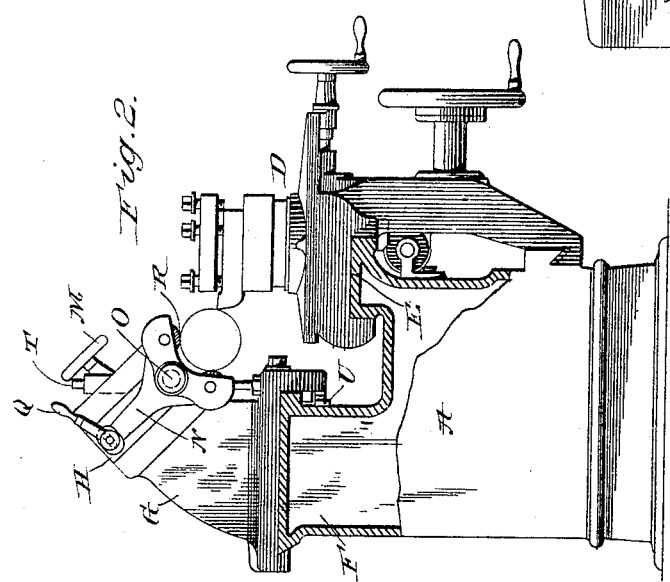
Witnesses
Inventor:
Hobart S. Johnson
By Dodge and Sons,
Attorneys.

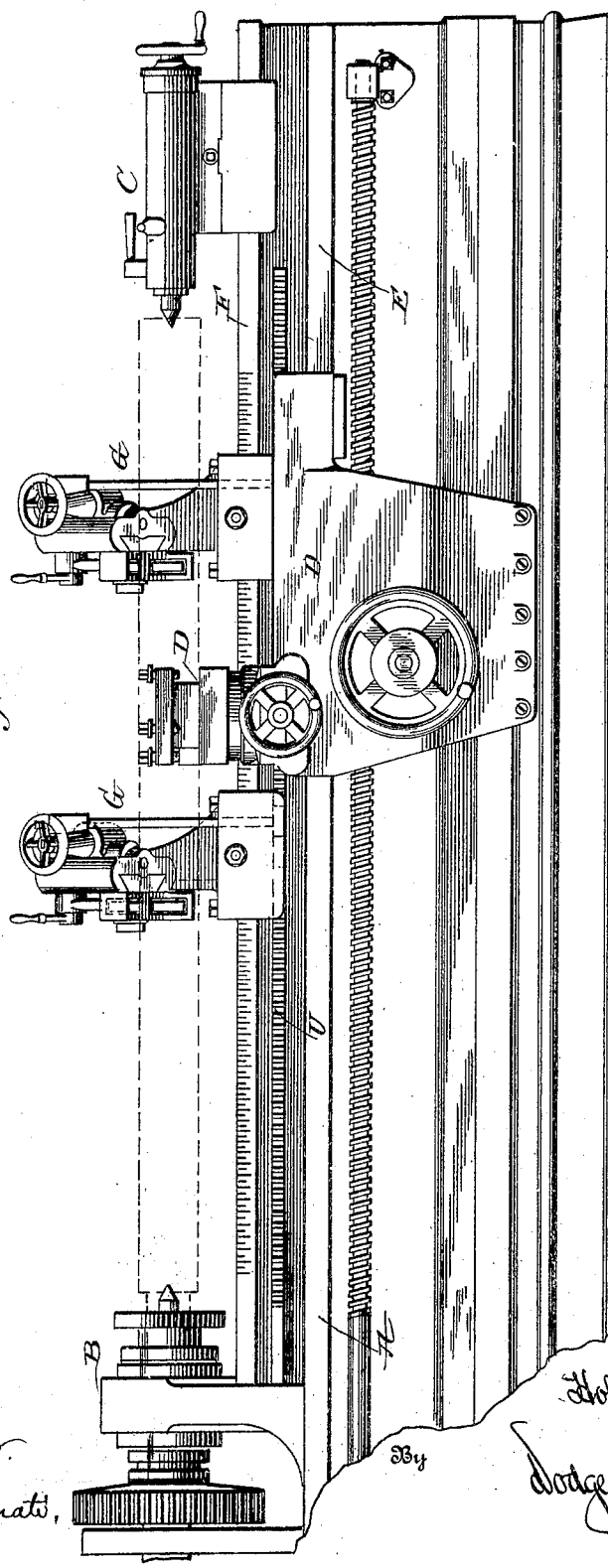

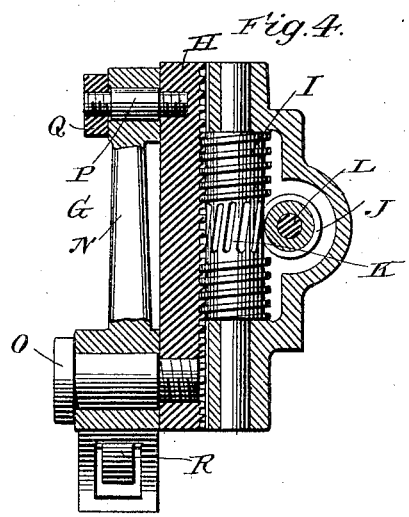
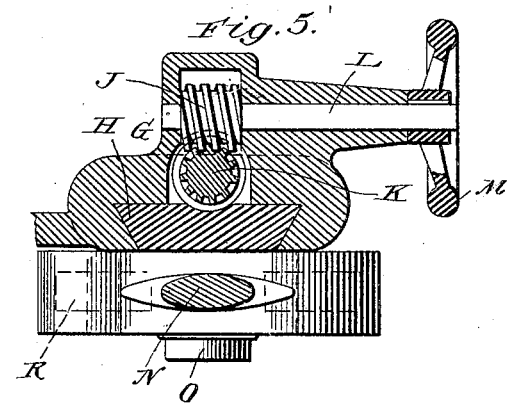
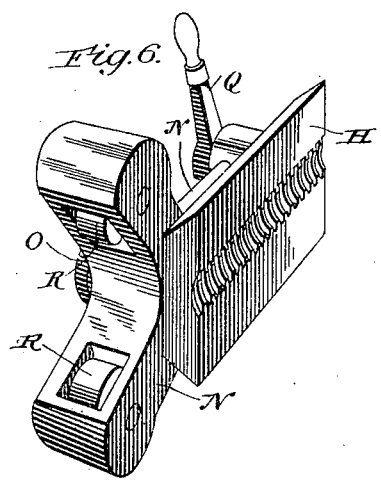
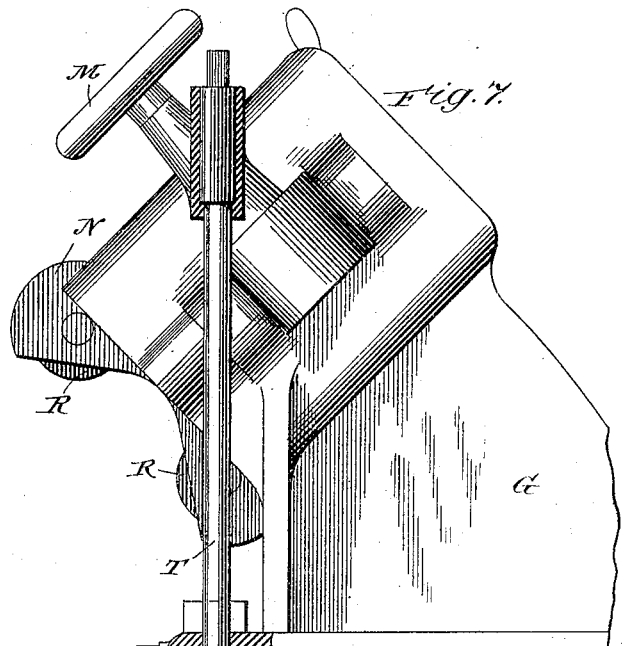
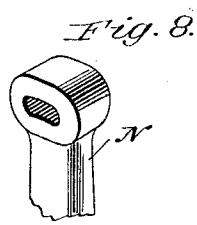

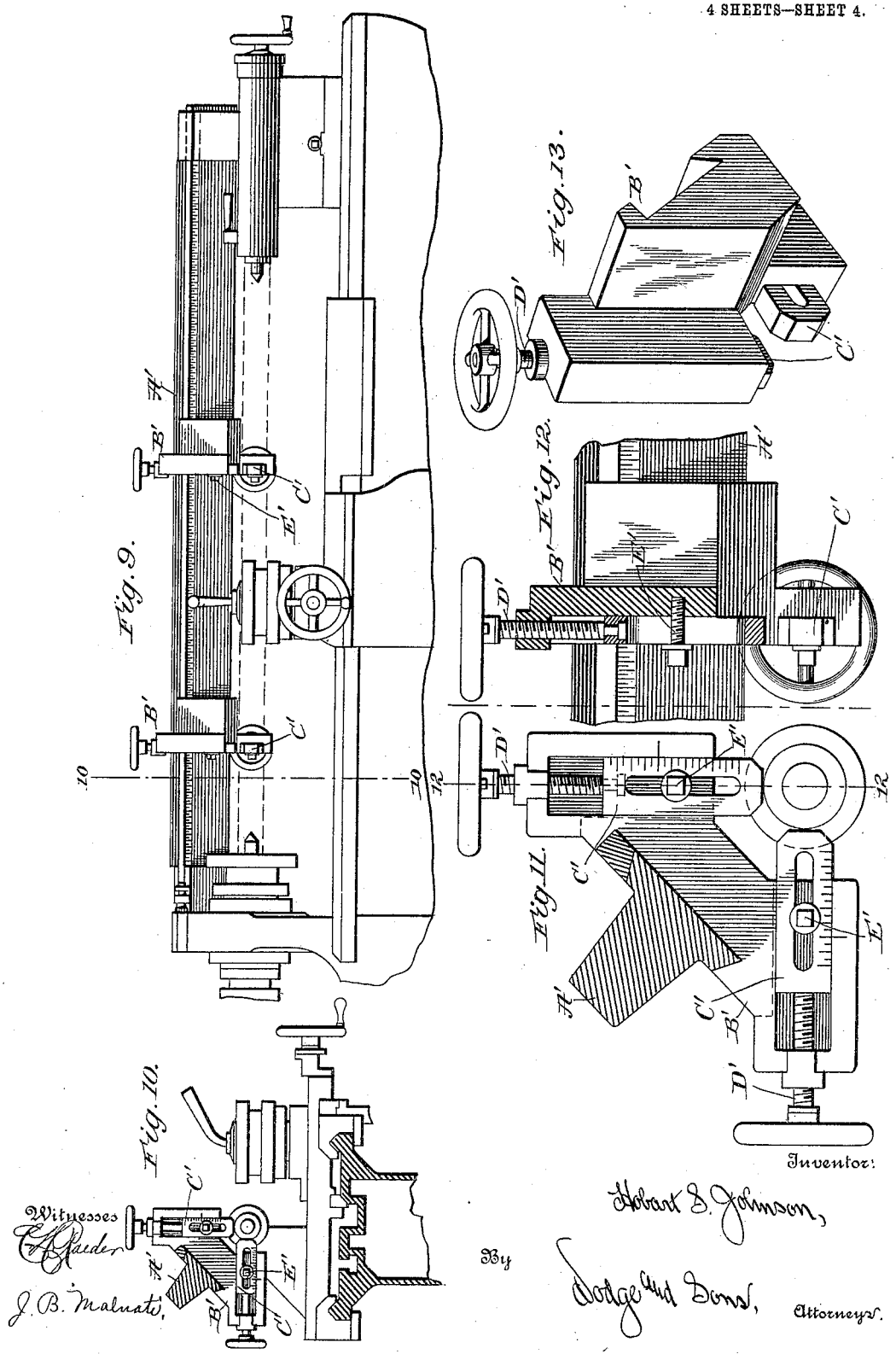

UNITED STATES PATENT OFFICE.

HOBART S. JOHNSON, OF MADISON, WISCONSIN.

STEADY-REST FOR LATHES.

No. 804,131.  Specification of Letters Patent.  Patented Nov. 7, 1905.

Application filed January 25, 1904. Serial No. 190,549.

*To all whom it may concern:*

Be it known that I, HOBART S. JOHNSON, a citizen of the United States, residing at Madison, in the county of Dane and State of Wisconsin, have invented certain new and useful Improvements in Lathes, of which the following is a specification.

My present invention pertains to improvements in lathes, the construction and advantages of which will be hereinafter set forth, reference being had to the annexed drawings, wherein—

Figure 1 is a front elevation of a lathe, showing one form of my invention; Fig. 2, an end view of the lathe, partly in section; Fig. 3, an enlarged elevation of one of the rests and its carriage; Fig. 4, a sectional view on the line 4 4, Fig. 3; Fig. 5, a similar view on the line 5 5, Fig. 3; Fig. 6, a perspective view of the steady-rest; Fig. 7, a side elevation the opposite of that illustrated in Fig. 3, portions being shown in section; Fig. 8, a detail perspective; Fig. 9, a front elevation of a lathe, showing a modification of my invention; Fig. 10, a sectional view on the line 10 10, Fig. 9; Fig. 11, an enlarged view showing the steady-rest and its carriage, the supporting-beam being shown in section; Fig. 12, a vertical sectional view on the line 12 12, Fig. 11; and Fig. 13 a perspective view of the modified form of carriage and rest.

The object of the present invention is to provide a steady-rest of such construction as will permit any number of tools being employed upon the work as may be found desirable, the rests being entirely independent of the tools or tool-carriages and of the guides or ways upon which the tool-carriages are mounted and work.

The invention is susceptible of embodiment in several forms, two of which, as above noted, are herein shown.

Referring first to the construction illustrated in Figs. 1 to 8, inclusive, A denotes the bed of a lathe; B, the head-stock; C, the tail-stock, and D the tool support or carriage, mounted and movable upon guides or ways E, as is usual. Any number of tool-carriages may be employed as found desirable with the work in hand, and the ways may be extended so that the tool-carriages can be traversed past the head and tail stocks, if desired.

Extending upwardly from the bed in rear of the center line of the lathe is a platform or column F, upon which is mounted one or more carriages G, each carriage carrying a steady back-rest of any approved type. In the form illustrated the rest comprises a slide H, mounted in a way or guide formed in the carriage. The slide is provided with a worm-rack upon its inner face, and a worm-shaft I meshes therewith. Said shaft is rotated by means of a worm J, which meshes with teeth K, formed on shaft I, as best shown in Figs. 4 and 5.

Worm J is actuated by a shaft L, which is mounted in carriage G and provided at its outer end with a hand-wheel M.

A Y-shaped arm N is pivotally secured to the slide by a tap-bolt O, the upper end of the arm being slotted, as shown in Fig. 8. A threaded stud P, one end of which is screwed into the slide H, passes through the slot, and a clamping-lever Q, mounted on the outer threaded end of said stud, serves to hold arm N in its adjusted position with reference to the slide. The lower diverging ends of the arm are pocketed, and rollers R are mounted therein, said rollers bearing upon the work and serving to maintain the same in its proper position against the pressure or force exerted by the tool.

A pinion S, carried at the lower end of a shaft T, is mounted in suitable bearings provided in the carriage G, said pinion meshing with a rack U, carried by the bed and serving as a means to properly and quickly traverse the carriage upon the platform or column F.

Under the present construction the carriage and rests may be traversed beyond the head and tail stocks, if so desired.

Referring to the construction disclosed in Figs. 9 to 13, inclusive, a bar or beam A' is secured in any suitable manner intermediate the head and tail stocks, said beam being of such size and strength as to prevent giving or springing of the same. Upon said beam any number of carriages B' may be mounted, each being provided with two adjustable slides or bars C' and each actuated by a threaded stem or shaft D' and held in its adjusted position by a clamping-bolt E'. The slides are graduated or provided with a scale, which may be read in conjunction with a mark on the carriage. The beam will also be provided with suitable graduations to facilitate the positioning of the carriages upon the same.

With both of the constructions herein described it will be noted that the rests are entirely independent of the ways upon which the tool-carriages work and also entirely independent of the tool-carriages themselves, so that there is no interference between the rests and the tool-carriages, which latter may traverse the whole length of their ways without in any manner affecting the position of the rests.

Assume that the bar to be turned is five feet long and of such a diameter that it is impossible to make any considerable cut without springing the same. The bar having been first centered is placed in the machine, a dog at one end being used for revolving the same with the spindle. Inasmuch as any necessary number of back-rests may be used, a cut will be taken on the bar as close to the tail-stock end as necessary to avoid springing of the bar. Preferably this cut should be such as to make the diameter about the same as that of the completed bar. A back-rest will next be adjusted to the bar at this point and another cut then taken on the bar, a second back-rest being adjusted to the newly-cut point. This operation is continued until there are sufficient steady-rests in place to keep the bar from springing. The tool slides or carriages are then run back to the tail-stock end, and inasmuch as several cutting-tools may be used on a very large amount of work one passage of the tool-slides over the piece would bring the work down to approximately the finished diameter.

The steady-rests will of course be located with reference to the shoulders on the bar, the scale on the beam or platform, as the case may be, facilitating this adjustment and obviating the necessity for using a hand-scale.

Having thus described my invention, what I claim is—

1. In combination with the bed of a lathe, a tail-stock; a head-stock; a tool-carriage mounted on the bed and freely movable the length thereof; a supporting member carried by the bed and independent of the tool-carriage ways; and a plurality of steady-rests mounted upon and adjustable lengthwise of said member, said rests being at all times out of the path of travel of the tool-carriage and the tool carried thereby, whereby the tool may be traversed the full extent of the lathe without interference with the rests which still remain in supporting contact with the work, substantially as described.

2. In combination with the bed of a lathe, a tail-stock; a head-stock; a tool-carriage mounted on the ways of the bed and freely movable the length thereof; a supporting member carried by the bed and independent of the tool-carriage ways; and a steady-rest mounted upon and adjustable lengthwise of said member, said rest being at all times out of the path of travel of the tool-carriage and the tool carried thereby, whereby the tool may be traversed past the rest without interference therewith, while the rest still remains in supporting contact with the work.

3. In combination with the bed of a lathe having the usual ways; a tool-carriage mounted thereon; a head-stock; a tail-stock; a supporting member independent of the tool-carriage ways, said member extending beyond the head-stock and tail-stock; and a steady-rest mounted upon and adjustable lengthwise of said member, said rest being at all times out of the path of travel of the tool-carriage and the tool carried thereby, whereby the tool may be traversed past the rest without interference therewith, while the rest still remains in supporting contact with the work and may be moved past the head-stock or tail-stock, substantially as described.

4. In combination with the bed of a lathe having the usual ways; a tool-carriage mounted thereon; a supporting member F extending upwardly from the rear portion of the bed; a series of supporting-carriages mounted upon and movable lengthwise of said member F; and a rest mounted upon each of said rest-supporting carriages and bearing upon the work at the rear thereof and out of the path of travel of the tool, whereby the tool may be traversed past the rests without interference therewith while the rests still remain in supporting contact with the work, substantially as described.

5. In combination with the bed of a lathe having the usual ways; a tool-carriage mounted thereon; a head-stock; a tail-stock; a supporting member independent of the ways for the tool-carriage; a carriage mounted upon said member; a slide mounted upon the carriage; a steady-rest pivotally mounted upon said slide, said rest standing at all times out of the path of travel of the tool-carriage and the tool carried thereby, whereby the tool may be traversed past said rest while the rest still remains in supporting contact with the work; and means for clamping the rest in its adjusted position.

6. In combination with the bed of a lathe having the usual ways; a tool-carriage mounted thereon; a supporting member independent of the ways; a carriage mounted upon said member; a slide working in said carriage; means for adjusting said slide; a steady-rest pivotally connected to the slide, said rest standing at all times out of the path of travel of the tool-carriage and the tool carried thereby, whereby the tool may be traversed past the rest while the rest remains in supporting contact with the work; and means for clamping the rest in its adjusted position.

In testimony whereof I have signed my name to this specification in the presence of two subscribing witnesses.

HOBART S. JOHNSON.

Witnesses:
G. E. GERNON,
H. J. PARKE.